(12) United States Patent
Singer et al.

(10) Patent No.: US 7,936,802 B2
(45) Date of Patent: May 3, 2011

(54) CO-EXTRUDED MULTILAYER POLYMERS FILMS FOR ALL-POLYMER LASERS

(75) Inventors: Kenneth Singer, Pepperpike, OH (US);
Eric Baer, Cleveland Heights, OH (US);
Anne Hiltner, Cleveland, OH (US);
Christoph Weder, Duedingen (CH)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 12/603,262

(22) Filed: Oct. 21, 2009

(65) Prior Publication Data
US 2010/0098126 A1 Apr. 22, 2010

Related U.S. Application Data

(60) Provisional application No. 61/196,831, filed on Oct. 21, 2008.

(51) Int. Cl.
*H01S 3/08* (2006.01)
*H01S 5/00* (2006.01)

(52) U.S. Cl. .................... 372/92; 372/50.124; 372/98

(58) Field of Classification Search .................. 372/50.1, 372/39, 50.12, 50.121, 50.124, 92, 98, 99
See application file for complete search history.

(56) References Cited

U.S. PATENT DOCUMENTS

| | | | | |
|---|---|---|---|---|
| 5,882,774 | A * | 3/1999 | Jonza et al. | 428/212 |
| 6,137,819 | A * | 10/2000 | Najda | 372/96 |
| 6,879,618 | B2 * | 4/2005 | Cok et al. | 372/70 |
| 2002/0171088 | A1 * | 11/2002 | Kahen et al. | 257/88 |
| 2004/0004778 | A1 * | 1/2004 | Liu et al. | 359/883 |
| 2005/0276295 | A1 * | 12/2005 | Kahen et al. | 372/39 |
| 2009/0273836 | A1 * | 11/2009 | Yust et al. | 359/494 |
| 2010/0221511 | A1 * | 9/2010 | Benson et al. | 428/212 |

* cited by examiner

*Primary Examiner* — Minsun Harvey
*Assistant Examiner* — Phillip Nguyen
(74) *Attorney, Agent, or Firm* — Tarolli, Sundheim, Covell & Tummino LLP

(57) ABSTRACT

A polymer film laser is provided that comprises a plurality of extruded polymer layers. The plurality of extruded polymer layers comprises a plurality of alternating dielectric layers of a first polymer material having a first refractive index and a second polymer material having second refractive index different than the first refractive index.

17 Claims, 12 Drawing Sheets

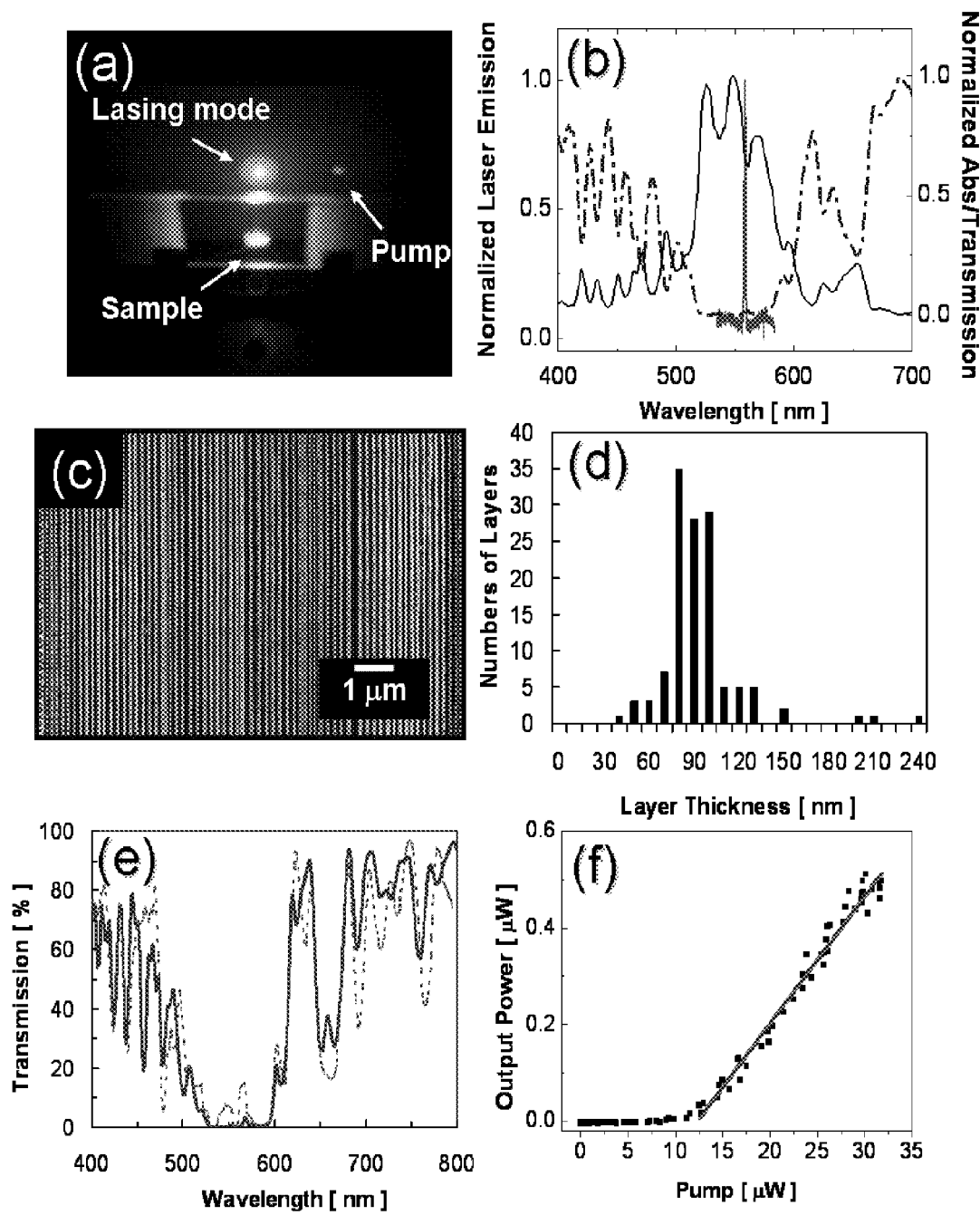
Figs. 8a-f

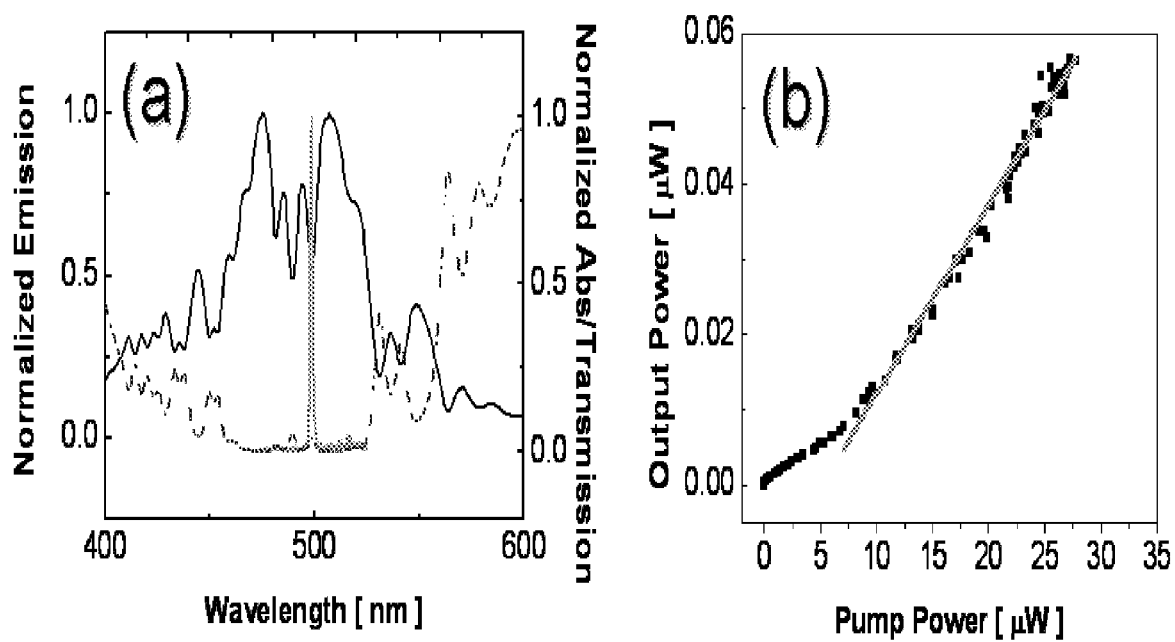
Figs. 9a-b

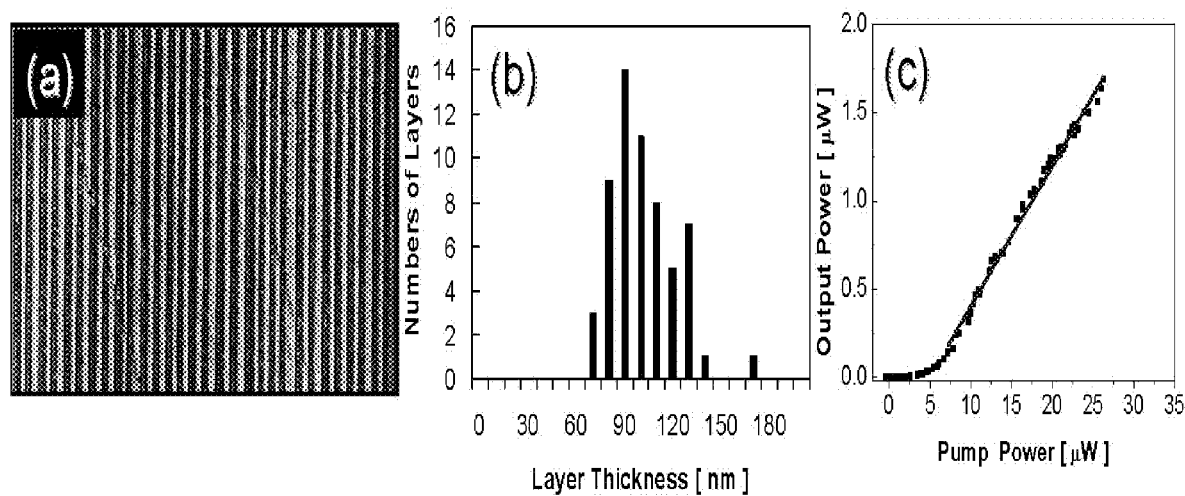
Figs. 10a-c (b)

CO-EXTRUDED MULTILAYER POLYMERS FILMS FOR ALL-POLYMER LASERS

RELATED APPLICATION

This application claims priority from U.S. Provisional Application No. 61/196,831, filed Oct. 21, 2008, the subject matter which is incorporated herein by reference.

GOVERNMENT FUNDING

This invention was made with government support under Grant No. RES501499awarded by The National Science Foundation. The United States government has certain rights in the invention.

TECHNICAL FIELD

The present invention relates to light emitting devices and particularly relates to polymer lasers.

BACKGROUND OF THE INVENTION

Polymer-containing lasers attract significant attention because of the broad tailorability and potential processing advantages of polymers. A major reason for the widespread interest in lasers that comprise polymeric gain media and/or polymeric resonators is the relative processing ease of polymeric materials vis a vis inorganic semiconductors. The possibility to fabricate all-polymer lasers through plastic fabrication processes is particularly attractive. However, because polymer resonators involve periodic microstuctures, the vast majority of organic lasers reported in the literature require comparably complex fabrication processes, such as, for example, spin-coating, molding and embossing techniques.

Vertical cavity surface emitting lasers have potential applications in optical communication systems, optical data storage, information display, sensors, optical interconnects of electronic circuits, among others. There is considerable activity in developing such lasers for these applications. Some applications such as optical data storage are already multibillion dollar businesses that could benefit from the low-cost manufacturing method.

SUMMARY OF THE INVENTION

The present invention relates to polymer film lasers, whose optical feedback and optical output coupling element comprises a plurality of extruded polymer layers, where the plurality of alternating dielectric layers of a first polymer material having a first refractive index and a second polymer material having second refractive index different than the first refractive index.

In an aspect of the invention, a distributed Bragg reflector laser is provided. Pluralities of alternating dielectric layers form a first distributed Bragg reflector stack and a second distributed Bragg reflector stack and extruded polymer layers containing gain moieties comprise at least one extruded polymer gain medium layer sandwiched between the first distributed Bragg reflector stack and the second distributed Bragg reflector stack.

In another aspect of the invention, the plurality of alternating dielectric layers comprise about 2 to about 500,000 layers of the first polymer material and about 2 to about 500,000 layers of the second polymer material.

In yet another aspect of the invention, the plurality of alternating dielectric layers of at least one of the first polymer material and the second polymer material are gain medium layers that incorporate gain moieties. The stack can also include a defect. Emission of the gain medium layers occurs at the defect wavelength or at the spectral edge of the reflection band.

In a further aspect of the invention, the plurality of polymer layers are coextruded to form a free-standing film. Each of the plurality of alternating dielectric layers can have a thickness of about 40 nm to about 1 micron.

In yet a further aspect of the invention, the polymer laser can be laminated on an electrically energized light pump (e.g., a semiconductor laser diode, a light emitting diode). Furthermore, an array of a plurality of lasers can be laminated on a plurality of electrically energized light pumps.

One or more of the plurality of alternating dielectric layers can include multiple emissive moieties for multiple color outputs. The multiple emissive moieties for multiple color outputs provide energy transfer and other interactions for providing up and down conversion and/or multiple color outputs. An array of a plurality of lasers can be stacked on one another to produce multiple color outputs.

In yet a further aspect of the invention, a method is provided of forming a polymer laser. The method comprises coextruding layers of a first polymer material having a first refractive index and a second polymer material having a second refractive index different than the first refractive index to form a plurality of alternating dielectric layers and multiplying the plurality of alternating dielectric layers to form at least one alternating dielectric layer stack. The coextruded multilayer polymer film provides the optical feedback and optical output coupling functions for the laser.

In one aspect of the invention, the plurality of alternating dielectric layers are multiplied to form at least one alternating dielectric layer stack comprising forming a first distributed Bragg reflector stack and a second distributed Bragg reflector stack and further comprising extruding one or more gain medium layers sandwiched between the first distributed Bragg reflector stack and the second distributed Bragg reflector stack.

In another aspect of the invention, the plurality of alternating dielectric layers of one of the first polymer material and the second polymer material are gain medium layers. The method can further comprise laminating the at least one alternating dielectric layer stack on an electrically energized light pump or laminating a plurality of dielectric layer stacks on a plurality of electrically energized light pumps. A plurality of dielectric layer stacks can be stacked on one another to produce multiple color outputs. The one or more of the plurality of alternating dielectric layers can be provided multiple emissive moieties for multiple color outputs.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 8 illustrates characterizations of 128 layer laser films of R6G-doped SAN25 and THV in accordance with an aspect of the invention.

FIG. 9 illustrates characterizations of 128 layer laser films of C1-RG-doped SAN25 and THV in accordance with an aspect of the invention.

FIG. 10 illustrates characterizations of 64 layer laser films of R6G-doped SAN25 and THV in accordance with an aspect of the invention.

DETAILED DESCRIPTION

Figure 1:
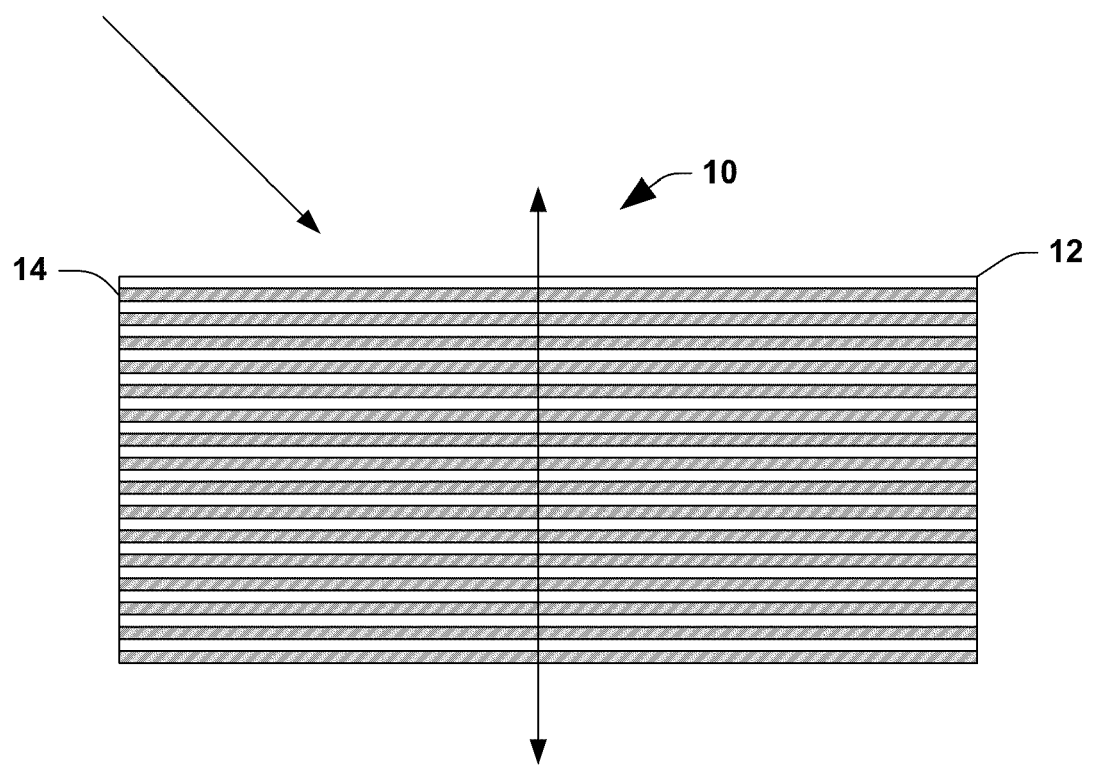
FIG. 1 is a schematic illustration of a distributed feedback laser in accordance with an aspect of the invention.

This present invention relates to method of producing polymer film lasers, such as organic vertical-cavity surface-emitting lasers, in which polymeric media comprise both the gain and feedback media of a surface-emitting laser, and to polymer film lasers produced by such methods. In general, lasers require four elements for operation: pump energy, a gain medium, feedback, and a method for extracting optical energy.

In a distributed Bragg reflector (DBR) laser, these four elements are traditionally formed by placing a gain medium containing an active atomic, molecular, or semiconductor nanoparticle species between two mirrors. The gain medium contains some appropriate concentration of the active species. Pumping is carried out by externally injecting optical or electrical energy into the gain medium. Feedback and output are produced by using two reflecting elements surrounding the gain medium, one having nearly complete reflectance and one lower reflectance allowing both feedback and output.

In a distributed feedback (DFB) laser, the feedback, output coupling and gain media are combined. In this case, a single periodic dielectric stack where the active gain medium is part of the periodic dielectric structure provides for all three functions. The feedback occurs through coherent optical interference effects which act to trap the light inside, thus providing the necessary feedback. In this case the periodic structure acts as a reflector and resonator for providing feedback and optical output coupling.

The polymer film lasers of the present invention are applicable to a wide variety of applications, including telecommunications, printing, optical up- and down-conversion, semiconductor circuit etching, thermal processing (e.g., marking, soldering and welding), spectroscopy, vehicular control and navigation, measurement devices, optical memory devices, displays, scanners, pointers, games and entertainment systems and sensors.

The polymer film laser can comprise a multilayer structure that includes a plurality of extruded polymer alternating dielectric layers of different refractive indices that form reflector stacks and at least one extruded polymer gain medium layer sandwiched between opposite reflector stacks. The polymer film lasers are characterized by a reflection band exhibiting spectrally selective reflection over a particular wavelength region as determined by the thickness and refractive index of the two polymers as well as by the number of layers. The alternating dielectric layers and the gain medium layers can have a different refractive index and be formed from different polymer materials. The gain medium layers also include a light emitting moiety or species that emits light upon pumping.

Alternatively, the polymer film laser can comprise a multilayer structure that includes a plurality of extruded polymer alternating dielectric layers of a first and a second refractive index, in which the alternating layers of one of the first and the second refractive index layers are gain medium layers.

Lasing is achieved by appropriately matching the fluorescence spectrum of the gain medium layer with the reflection band of the alternating dielectric layers. The appropriate design is achieved by considering the nature of the optical resonance within the periodic structure. This resonance is characterized by dispersion bands that are determined by the solutions of Maxwell's equations with the appropriate boundary conditions. It is found that the resulting bands lead to slowing of light near band edges and defect band edges. Lasing will most efficiently occur when the peak emission is lined up with the most appropriate band edge. When the emissive species is in the low refractive index material, emission will occur at the low wavelength side of the band, while it will occur at the long wavelength edge when the emissive species is in the high refractive index species.

One of ordinary skill in the art will readily appreciate that a wide variety of materials can be used to form the multilayer structure of the present invention. The components comprising the different layers of the multilayer structure are polymeric materials chosen to have a difference in the index of refraction of the layers preferably on the order of from 0.1 or higher with higher values providing more effective feedback. The degree of index mismatch determines the spectral width and depth of the reflection band, which determines the lasing threshold and efficiency. The components comprising the layers are preferably a polymeric material, a polymeric composite material, and/or an oligomeric material. The content of the light emitting moiety in the polymeric material is preferably in the order of 0.1 to 5 wt % adjusted for the desired threshold and efficiency. Further, it is preferred that a good inter-layer adhesion between co-extruded layers is exhibited in the multilayer structure to reduce the possibility of delamination during end use.

The term "polymeric material" as used in the present application denotes a material having a weight average molecular weight (Mw) of at least about 5,000. Preferably, the polymeric material is an organic polymeric material. The term "polymeric composite material" as used in the present application denotes a combination of a polymeric material with at least one more material dispersed therein; the additional material can be another polymeric or organic material or an inorganic material. Examples of such inorganic materials include inorganic fillers, such as glass, titanium dioxide and talc. Further, the inorganic material may be the form of particles, rods, fibers, plates etc.

It is preferred that the composite material is substantially optically transparent. Accordingly, it is preferred that the dispersed material is miscible with the polymeric materials, has a refractive index substantially the same with the polymeric material or is finely dispersed to avoid light scattering.

Such composite materials are a convenient and useful way to control the linear part of the refractive index in the individual layers. The term "oligomeric material" as used in the present application denotes material with a degree of polymerization (DP) between 10 and 1000.

Examples of polymeric materials in accordance with the present invention include but are not limited to, polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers, such as atactic, isotactic and syndiotactic polystyrene, α-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; polyetheramides. Copolymers can also be used and include, for example, styrene-acrylonitrile copolymer (SAN), containing between 10 and 50 wt %, preferably between 20 and 40 wt %, acrylonitrile, styrene-ethylene copolymer; and poly(ethylene-1,4-cyclohexylene-dimethylene terephthalate) (PETG). In addition, each individual layer may include blends of two or more of the above-described polymers or copolymers. Preferred polymeric materials include poly(methyl methacrylate) (PMMA) and polystyrene (PS).

The light emitting moiety provided in the gain medium layer can include a photoemissive species that can be doped, covalently attached, or otherwise incorporated into the gain medium layers material, and that emits light at a first wavelength upon absorbance and excitation of light with a second wavelength. This species can be one or more fluorescent species, such as one or more organic dyes and/or semiconductor nanoparticle. In one example, the light emitting moiety can be highly efficient luminescent molecules, such as fluorescent dyes, that are readily soluble in the polymeric material of the grain medium. Examples of fluorescent dyes that can be used include DCM, DC M2, Rhodamine 6G, Perylene, Coumarin 47, Coumarin 30. The formulae for these chemicals are shown respectively in U.S. Pat. No. 6,160,828, which incorporated herein by reference in its entirety. It is to be appreciated that a polymer material having a selected fluorescent can be selected to be a gain medium layer or layers. The polymer film laser can fabricated using these materials in a multilayer extrusion technique. The method preferably yields a flexible large film of multilayer structure. For use in the near ultraviolet, visible and near infrared, the thickness can be in the range of about 50 nm to 1 micron.

The term "about" is used in the present application to denote a deviation from the stated value. Preferably, the polymeric materials used in the alternating layers are transparent in the above region. The layer thickness can be varied or chirped to provide variable reflectivity over a broad band of wavelengths and acceptance angles. Preferably, the layers have substantially uniform layer thickness, where "substantially" is used to denote a deviation within 20%.

For simplicity of discussion, the behavior of a two component system is described. In this embodiment of the present invention the multilayer structure is made of two alternating layers (ABABA . . . ) of two polymeric materials referred to as component "(a)" and component "(b)", respectively, throughout the description. The components (a) and (b), may be the same or different and form a multilayer structure represented by formula $(AB)_x$, where $x=(2)^n$, and n is the number of multiplier elements. One of components (a) and (b) can include a light emitting moiety. It should be understood that the multilayer structure of the invention may include additional types of layers. The components of the various alternating layers may be the same or different. For instance, a three component structure of alternating layers (AB-CABCA . . . ) of components (a), (b) and (c) is represented by $(ABC)_x$, where x is as defined above.

In the two-component system described above one of the alternating layers (A) can comprise component (a) which is a polymeric material with an incorporated gain moiety and a second alternating layer (B) comprises component (b) which may be a polymeric material alone. It is desirable to adjust the composition so that the difference between the linear index of the layer containing the fluorescent dye and the linear index of the polymeric material alone is between 0 and 10% including any increments therein, preferably with with higher values providing more effective feedback. The multilayer structure in the above embodiment is represented by formula $(AB)_x$, where $x=(2)^n$, and n is the number of multiplier elements.

Figure 4:
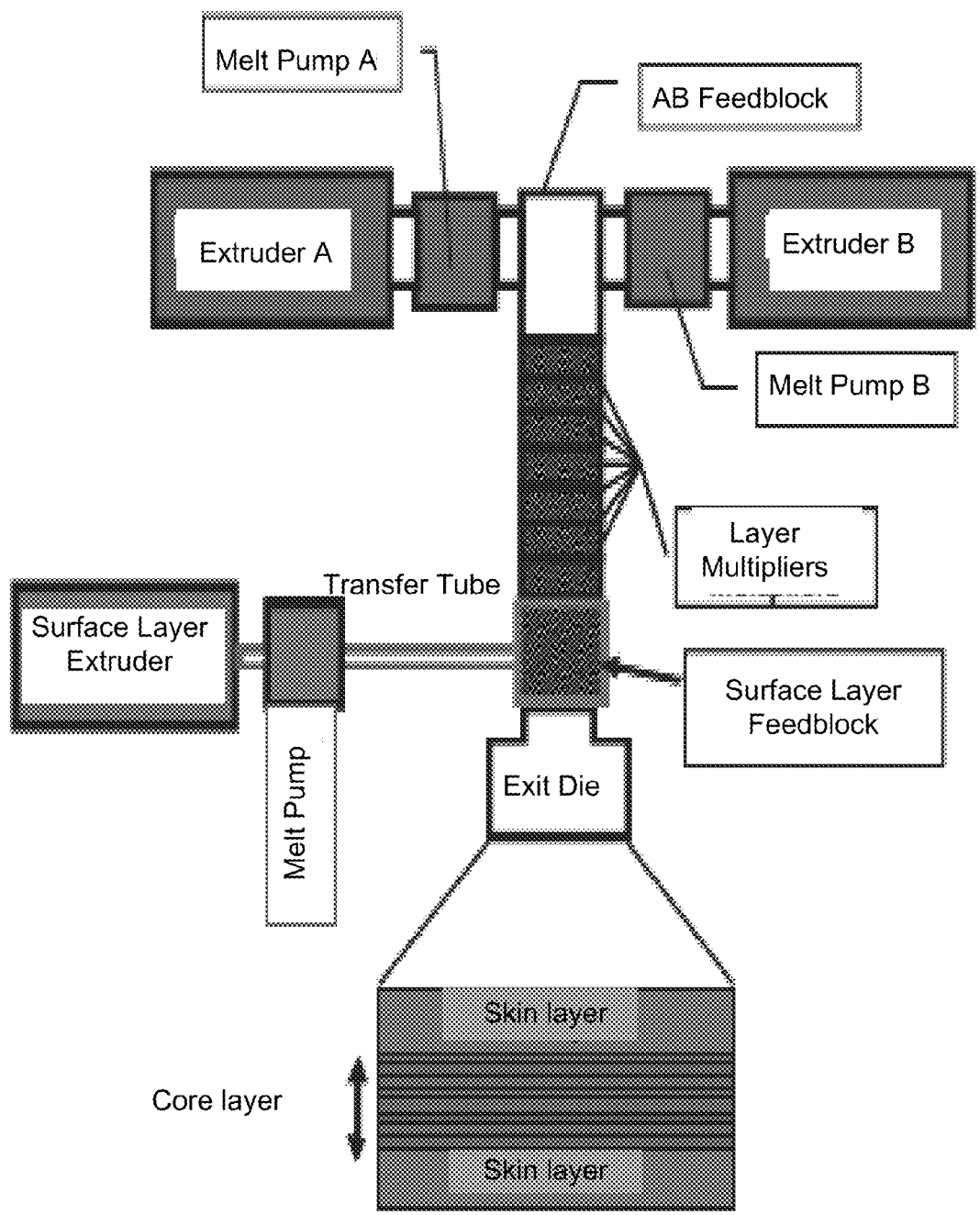
FIG. 4 illustrates a schematic illustration of a multilayer coextrusion process in accordance with an aspect of the present invention.

In the embodiment described above of a two-component multilayer structure, the polymer film layer is prepared by microlayer coextrusion of the two polymeric materials. Nanolayers are comprised of alternating layers of two or more components with individual layer thickness ranging from the microscale to the nanoscale. A typical multilayer coextrusion apparatus is illustrated in FIG. 4. The details for employing the coextrusion apparatus illustrated in FIG. 4 can be found in U.S. Pat. No. 6,582,807, which is incorporated herein by reference in its entirety. The two component (AB) coextrusion system consists of two ¾ inch single screw extruders each connected by a melt pump to a coextrusion feedblock. The feedblock for this two component system combines polymeric material (a) and polymeric material (b) in an (AB) layer configuration. The melt pumps control the two melt streams that are combined in the feedblock as two parallel layers. By adjusting the melt pump speed, the relative layer thickness, that is, the ratio of A to B can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements to form a multilayer stack. It is understood by those skilled in the art that the number of extruders used to fabricate the structure of the invention equals the number of components. Thus, a three-component multilayer (ABC . . . ), requires three extruders.

The multilayer structure (e.g., multilayer stack) of the present invention preferably has at least 30 layers, including any number of layers within that range. Preferably, the multilayer structure of the present invention has from 50 to 10000 layers. Preferably, the multilayer structure is in the form of film. By altering the relative flow rates or the number of layers, while keeping the film thickness constant, the individual layer thickness can be controlled. The multilayer structure film has an overall thickness ranging from 10 nanometers to 1000 mils, preferably from 0.1 mils to 125 mils and any increments therein. Further, the multilayer structures may be formed into a number of articles. The structures may be formed by coextrusion techniques initially into films, which may then be post formed. Such post forming operations may include thermoforming, vacuum forming, or pressure forming. Further, through the use of forming dies, the multilayer structures may be formed into a variety of useful shapes including profiles, tubes and the like. It is to be appreciated that the multilayer structure film can be stretched or compressed to change the thickness and thus the emitted wavelength of the multilayer structure film.

Polymer film lasers in accordance with the present invention having various structures can be produced with the microlayer processing technology. FIG. 1 is an example of a polymer film laser 10 in accordance with an aspect of the invention. The polymer film laser 10 in this aspect is a distributed feedback laser that consists of alternating dielectric layers 12 and gain medium layers 14. The dielectric layers 12 and the gain medium layers 14 can have different refractive indices and be formed from different polymer materials. Either or both types of layers can include a light emitting moiety that emits light upon pumping.

Figure 2:
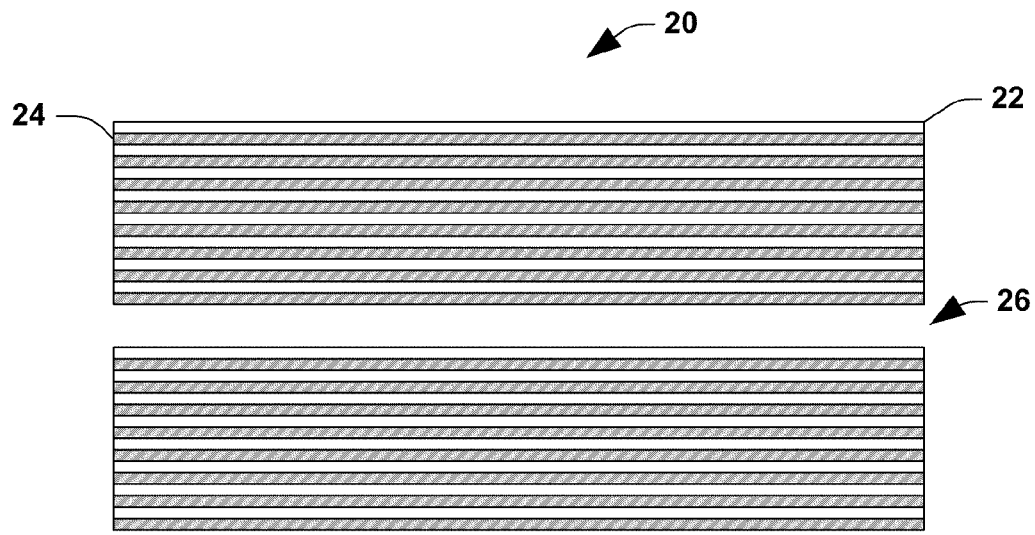
FIG. 2 is a schematic illustration of a distributed feedback laser with a defect layer in accordance with another aspect of the invention.

FIG. 2 is another example of a polymer film laser 20 in accordance with present invention. The polymer film laser 20 in this aspect is a distributed feedback laser with a defect layer. The polymer laser 20 consists of alternating dielectric layers 22 and gain medium layers 24. The dielectric layers 22 and the gain medium layers 24 can have different refractive indices and can be formed from different polymers. Either or both types of layers can include a light emitting moiety that emits light upon pumping. The polymer film laser 20 also includes a defect layer 26 or defect region whose width and composition differs from the structure. Examples of defects include a thin air layer, an extra layer or layers of either of the polymers or dielectric materials. Emission of the laser 20 can occur at the defect wavelength.

Figure 3:
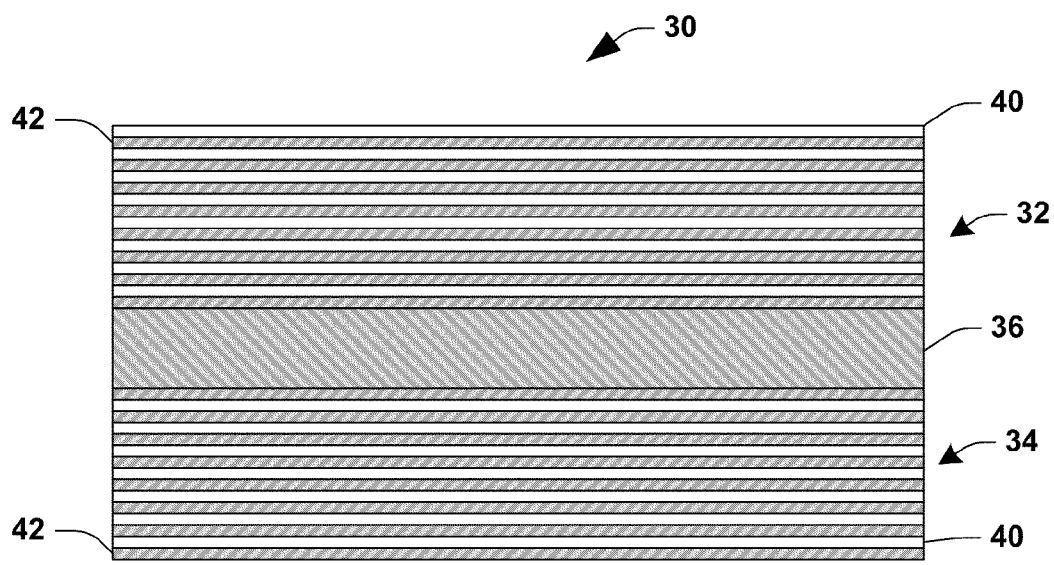
FIG. 3 is a schematic illustration of a distributed Bragg reflector laser in accordance with another aspect of the invention.

FIG. 3 is an example of a polymer film laser 30 in accordance with yet another aspect of the invention. The polymer film laser 30 in this aspect is distributed Bragg reflector (DBR) laser. The polymer film laser includes a first stack 32 and a second stack 34 of alternating dielectric layers 40 and 42 that sandwiches a gain medium layer 36. The alternating dielectric layers 22 can have different refractive indices and can be formed from different polymers. The alternating dielectric layers 40 and 42 of the first stack 32 and the second stack 34 form distributed Bragg reflectors. The gain medium layer 36 includes a light emitting moiety that emits light upon pumping.

Figure 5:
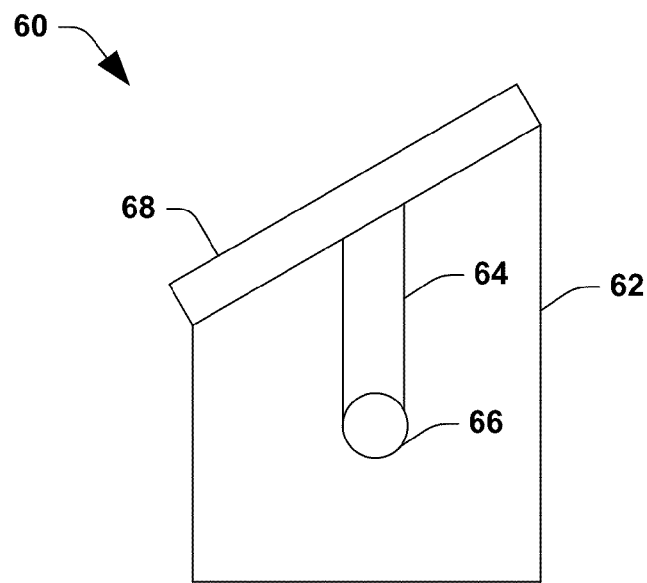
FIG. 5 illustrates a schematic cross-section of electrically energized laser device in accordance with an aspect of the present invention.

FIG. 5 illustrates an electrically energized laser device 60 in accordance with an aspect of the present invention. The device 60 includes a base portion being, for example, an injection molded plastic case 62 having an angled surface and a channel 64 disposed therein that extends from the angled surface to an interior of the base portion 62. A polymer or glass sphere acting as a focusing lens 66 resides in a bottom portion of the channel 64 interposed between a semiconductor laser diode or light emitting diode (not shown) which is electrically energized and the polymer laser film 68. This polymer film laser multilayer structure 68 as described in FIGS. 1-3 is laminated over the angled surface of the base portion 62 to form the laser device 60. The laser diode or light emitting diode in the package beneath the sperhical lens, could be a compound inorganic semiconductor device well known in the trade, whose emitted light is focused by the spherical lens into the laminated polymer multilayer laser. The wavelength emitted by the polymer film laser is selected based on a desired color and can be customized based on the particular materials and thicknesses selected to form the polymer film laser. It is to be appreciated that a plurality of such devices could be closely spaced together to provide an array suitable for a display or parallel optical communication array. Appropriate emission colors would be selected for the application.

Figure 6:
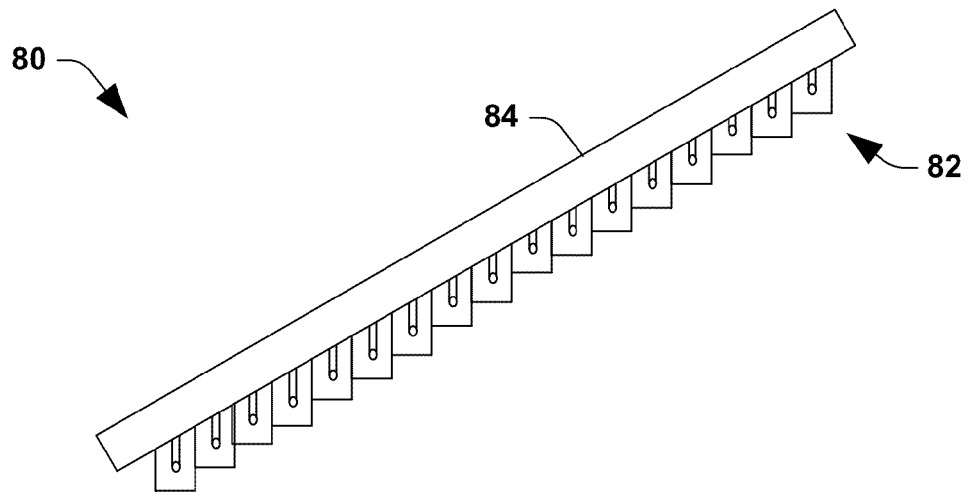
FIG. 6 illustrates a schematic cross-section of a laser array concept in accordance with an aspect of the present invention.

FIG. 6 illustrates a laser array 80 in accordance with an aspect of the present invention. The laser array 80 includes an array of individual cells 82 described in FIG. 5 with a large multilayer stacked film 84 extending over a plurality of base portions and diode pumps. Appropriately arrayed red, blue and green emitters would, for example, form a full color display.

This invention is further illustrated by the following examples, which should not be construed as limiting. The contents of all references, patent applications, patents, and published patent applications cited throughout this application are hereby incorporated by reference.

EXAMPLE 1

The following distributed feedback (DFB) laser examples report on the fabrication of optically-pumped, all-polymer, surface-emitting, distributed feedback dye lasers by multilayer co-extrusion in a single roll-to-roll process. The method, which allows the production of multilayer films with hundreds of alternating nanometer-thin layers, (C. D. Mueller, S. Nazarenko, T. Ebeling, T. L. Schuman, A. Hiltner, E. Baer. *Polymer Engineering and Science* 1997, 37, 355-362; R. Y. Liu, Y. Jin, A. Hiltner, & E. Baer. *Macromol. Rapid Commun.* 2003, 24, 943-948.), capitalizes on the melt-processibility of polymers and is capable of rapidly producing large areas of high-quality laser films in a one-step roll-to-roll melt process. These flexible thin-film devices can be laminated onto diode pump lasers or photonic circuits for various applications. Roll-to-roll processing by multilayer coextrusion of active photonic and electronic devices such as wavelength-agile polymer lasers could open new approaches to display, sensing, optical communication, and data storage technologies.

Example 1 is an example of fabrication and analysis of multilayer distributed feedback (DFB) lasers. The DFB lasers investigated here were fabricated using a layer-multiplying co-extrusion process (FIG. 4) that produces films consisting of tens to thousands of alternating layers of two different polymers. In the one-step melt process used here, two polymer melt streams are combined in a feedblock to form a bilayer. In the first multiplying element, the bilayer melt is sliced, spread and recombined to double the number of layers. The process can be repeated with additional multipliers to produce a film stack with $2^{(m+1)}$ layers, where m is the total number of multipliers. A thick sacrificial polymer skin layer can be added to the melt near the exit die to increase the mechanical stability and surface quality of the thin multilayer film stack. From the exit die, the film is cast onto a chill roll. The two polymers used here were SAN25 (RI=1.57) and THV 220G (RI=1.37). The high refractive index contrast ($\Delta n = 0.2$) between the two polymers produced vivid reflected light that could be selectively tuned by the thickness of the polymer layers. The media was created by doping a fluorescent dye into one of the two co-extruded polymers.

Figure 7A:
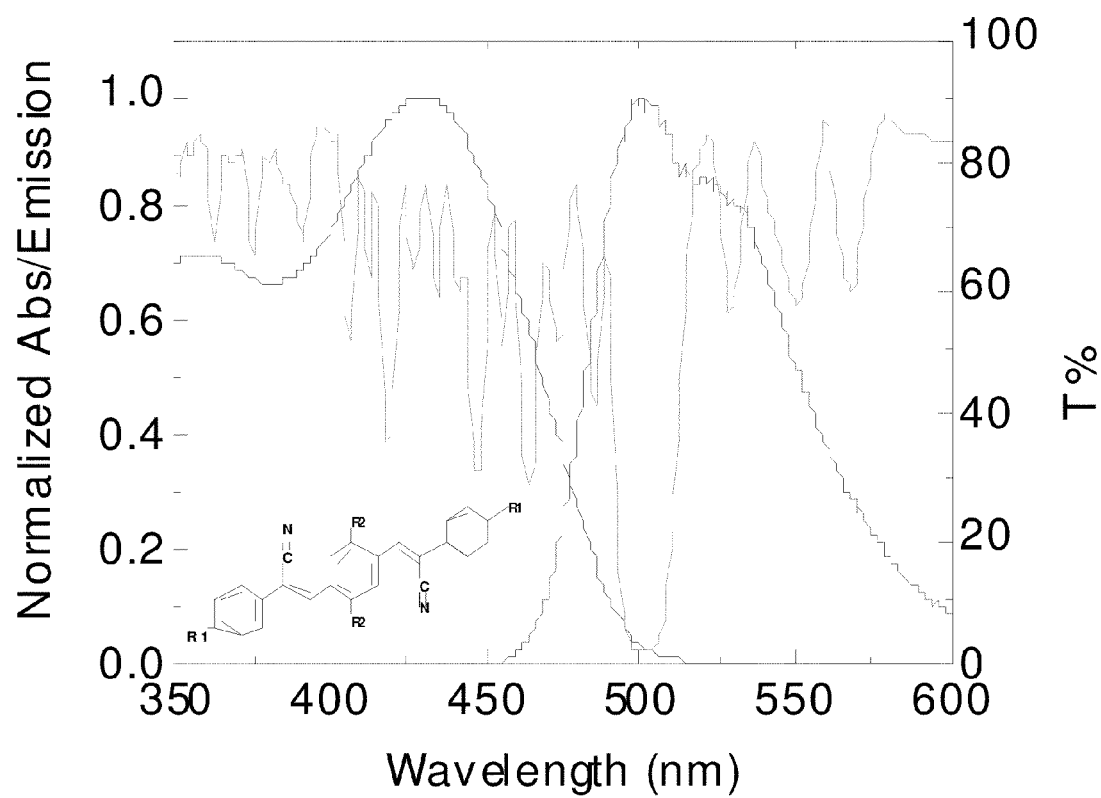
FIG. 7 illustrates plots showing (A) reflection band, absorption, and emission of the gain dye species C1-RG and (B) reflection band, absorption, and emission of R6G.
Figure 7B:
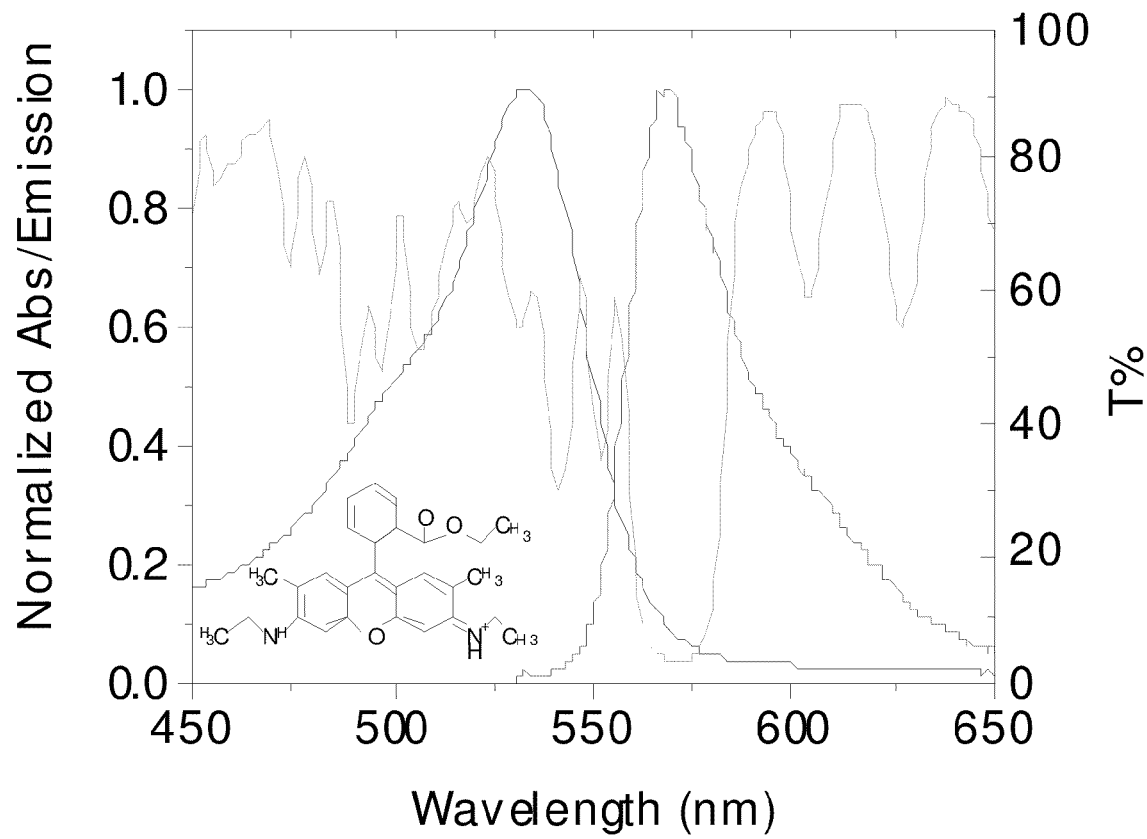

Two organic fluorescent dyes with different emission spectra were used, rhodamine 6G perchlorate (R6G, 99% pure, purchased from Fisher-Scientific and used as received) and 1,4-bis-(α-cyano-4-methoxystyryl)-2,5-dimethoxy-benzene (C1-RG, synthesized as reported elsewhere (C. Löwe & C. Weder. *Synthesis* 2002, 9, 1185-1190.)). The absorption and fluorescence spectra and the chemical structure of both dyes hosted in SAN25 are shown in FIGS. 7a and 7b. C1-RG displays a large stokes shift with absorption maximum at 434 nm and fluorescence maximum at 515 nm. R6G has a smaller stokes shift with absorption maximum at 530 nm and fluorescence maximum at 552 nm. Both dyes were found to be highly soluble in SAN25 and insoluble in THV and thus were incorporated into the SAN25 layers. This was done by solution-blending the dye with SAN25 in chloroform to create a masterbatch containing 15 wt % dye. The blends were dried in vacuum at 70° C. for 2 days, pelletized and dry mixed with neat SAN25 to create blends with a nominal dye concentration of 1 wt %.

Strong laser action from a coextruded 128 layer R6G DFB polymeric laser can be seen in FIG. 8a. The lasing spectrum is overlaid with the transmission spectrum in FIG. 8b, which includes contributions from both reflection and dye absorption. The output mode at 559 nm (FWHM of 1.3 nm) is plotted with the transmission of the overall film indicating an output mode at a defect-like feature near the center of the reflection band instead of that expected at the band edge. In order to gain insight regarding the origin of this feature, the cross-section of the 128 layer R6G DFB laser film was imaged using Atomic Force Microscopy (AFM) (FIGS. 8c, d). The average layer thickness was 95±25 nm. The distribution of the layers indicated the presence of randomness as well as some 100-250 nm defects in our lasing cavities accounting for the transmission features. The band structure was confirmed by transfer matrix simulations, using the layer thickness distribution obtained from AFM with the results shown in FIG. 8e. The output power and threshold depended on the pumping angle due to the blue shift of the reflection band with increasing angle. Efficient lasing occurred at 15° and 50° for the 128 layer R6G DFB laser; at these angles, the pump wavelength matched a relative transmission maximum. The output-input plot of the 128 layer R6G DFB laser is shown in FIG. 8f. The slope efficiency was calculated to be 2.6% with an observed lasing threshold of 238 μJ/cm$^2$ pumped at an angle of 50°. The 128 layer C1-RG DFB laser displayed similar features as the corresponding R6G DFB laser (FIG. 9a). The output mode for this device was 499 nm (FWHM of 1.4 nm) with a slope efficiency of 0.25%, threshold of 104 μJ/cm$^2$ (pumped at 28°) and efficient lasing at pump angles of 28° and 42° (FIG. 9b).

A series of 64 layer R6G DFB coextruded laser films with a nominal dye concentration of 1.5% were examined. FIG. 10a shows the AFM image of the cross-section of a typical film sample and FIG. 10b shows the layer thickness distribution. The average layer thickness was measured to be 100 nm±18 nm. Thus, the layer uniformity was somewhat better than in the 128 layer films, but lasing was not observed in these films due to insufficient feedback. To increase the feedback, five 64 layer R6G DFB laser films were stacked to produce an assembly with a total of 320 alternating layers. An output-input plot of this device is shown in FIG. 8c. The slope efficiency for this 64 layer stacked structure was 8% with a threshold of 100 μJ/cm$^2$ pumped at 46°. Lasing efficiency in the 64 layer 5 film stacks improved threefold over the single 128 layer laser system likely due to the higher uniformity in the 64 layer stacks.

Efficient optically-pumped distributed feedback all-polymer dye lasers were fabricated using a continuous melt processing method, demonstrating production in a single roll-to-roll process, whose scalability and technological usefulness has already been demonstrated in a range of (passive) products. Paramount to producing high performance DFB lasers during coextrusion, an effective barrier layer to dye diffusion, THV, has been discovered and used to confine dye molecules into one layer. Low threshold, high efficiency lasers having well-defined spatial and temporal modes were observed. Layer thicknesses can be controlled using the take-up roll and stretching so that lasers can be fabricated over a broad spectral range throughout the visible and near-infrared when appropriate lasing media are used. Lasing occurred in native defect modes arising from nonuniformity in the layer thickness, which is difficult to avoid on laboratory-scale equipment. Improved lasing performance can be expected as layer uniformity is improved and more stable gain media incorporated. In addition, effective electrical pumping might be possible in improved lasers by laminating these multilayer lasers onto a semiconductor diode pump laser.

EXAMPLE 2

Example 2 describes the fabrication of surface-emitting distributed Bragg reflector (DBR) lasers, which consist of a compression molded dye-doped polymer gain medium and photonic crystal (PC) resonators fabricated by multilayer polymer co-extrusion. By careful design and process optimization, outstanding performance has been achieved. Both processing methods involve simple shaping of melted polymers and lend themselves to high-throughput roll-to-roll manufacturing of all plastic lasers. The resulting lasers can be mass produced and could find application in spectroscopy, remote sensing, data storage, and display.

The resonators were fabricated by a layer-multiplying co-extrusion process (FIG. 4) and consisted of 128 alternating layers of poly(methyl methacrylate) (PMMA) and polystyrene (PS). The difference of the refractive indices n of PS (n=1.585±0.002) and PMMA (n=1.489±0.002) causes the multilayer films to display a sharp reflection band. The centers of the resonators' reflection bands were matched with the emission spectra of two series of gain media by controlling the thickness of the polymer layers during the extrusion process, and fine-tuning the properties by reducing the film thickness by subsequent biaxial stretching. (T. Kazmierczak, H. Song, A. Hiltner, and E Baer, "Polymeric one-dimensional photonic crystals by continuous coextrusion," Macromol. Rapid Commun. 28, 2210-2216 (2007)). The layers thicknesses were designed so that the high energy edge of the reflection band coincided with the emission maximum of the laser dye.

Gain media were prepared by incorporating the fluorescent organic dyes rhodamine 6G perchlorate (R6G) (with molecular weight, MW=546 g/mole) and 1,4-bis-(α-cyano-4-methoxystyryl)-2,5-dimethoxy-benzene(C. Löwe and C. Weder, "Synthesis and properties of photoluminescent 1,4-bis-(α-cyano-4-methoxystyryl)-benzenes," Synthesis Sp.Is. (9) 1185-1190 (2002)) (C1-RG, FIG. 7(a)) (with molecular weight, MW=452 g/mole) into glassy amorphous host polymers and compression-molding thin films whose thickness was varied between 10 and 137 μm. C1-RG is highly soluble in PMMA (B. Crenshaw and C. Weder, "Thermally induced color changes in melt-processed photoluminescent polymer blends," Adv. Mater. 17, 1471-1476 (2005)) and C1-RG/PMMA blends (1.6×10$^{-3}$ to 5.3×10$^{-2}$ M) display strong green fluorescence and a large Stokes shift with absorption ($\lambda_a$) and emission ($\lambda_e$) maxima of ~430 and ~501 nm (FIG. 7(a)). The R6G/PMMA blends (3.3×10$^{-4}$ to 1.0×10$^{-2}$ M) display a smaller Stokes shift ($\lambda_a$=532 nm; $\lambda_e$=565 nm) (FIG. 7(b)) than C1-RG/PMMA and were photochemically more stable. Lasers were assembled by sandwiching two DBR minors (with reflection bands matched to the emission maxima of the gain medium) and the gain medium between two glass slides; a minute amount of silicon oil was applied to all interfaces as an index-matching fluid. For R6G lasers, the layer thicknesses of the reflectors were approximately 92±21 nm yielding a band center at 565 nm. In the case of C1-RG lasers the layer thicknesses of the reflectors were approximately 84±19 nm resulting in a band center at 510 nm. In order to minimize fluctuations in the layer thickness and ease manufacture, a 50:50 feedblock was employed giving each single layer approximately the same thickness. FIG. 7 shows the absorption and emission spectra of the dye as well as the transmission spectrum of the multilayer films.

Refractive indices were measured at 633 nm with a Metricon 2010™ prism coupler. The fluorescence spectra were recorded with an ICCD camera spectrometer with excitation at 430 nm (C1-RG) or 532 nm (R6G). The surface-emitting lasers were pumped at oblique incidence with a tunable optical parametric oscillator (OPO), which was pumped by a frequency-tripled Nd:YAG laser ($\lambda$=355 nm, pulse length 7 ns, frequency 10 Hz, p-polarized). Lasers comprising R6G and C1-RG gain media were pumped at 530 nm, and 430 nm, respectively. A rotatable half-wave plate together with a linear polarizer was used to control the power of the incident beam in a continuous manner. The pump beam, focused by a lens with 7.5 cm focal length, was incident at an angle of 10° from normal, allowing the pump light to fully penetrate the DBR reflectors by avoiding the reflection band. A knife-edge technique was used to measure the spot size of the focused pump beam. An objective lens was employed to collect the emission at the normal direction. Color filters were used to block the scattered pump light. An ICCD camera spectrometer was used to measure the emitted spectrum, and calibrated photodiodes were employed to measure the input and output power.

The DBR minors comprising 128 alternating PS and PMMA layers (i.e., 64 each) had a standard deviation of layers thickness of 22% and a film thickness of about 10-12 $\mu$m as determined by direct measurement of AFM images of the film cross section. This non-uniformity results in the appearance of relatively intense and irregular side peaks, as is evident in FIG. 7($a$) and ($b$). The minimum threshold fluence observed in C1-RG samples was 435 $\mu$J/cm$^2$ in a laser having a 135 $\mu$m thick gain layer comprising the dye in a concentration of 1.6×10$^{-3}$ M. In the case of R6G lasers, the minimum threshold fluence was 90 $\mu$J/cm$^2$ in a device having a 40 $\mu$m thick gain layer at 5.4×10$^{-3}$ M. The output of the R6G samples was stable over long periods of time, which bodes well for the potential technological application of these devices.

Figure 12A:
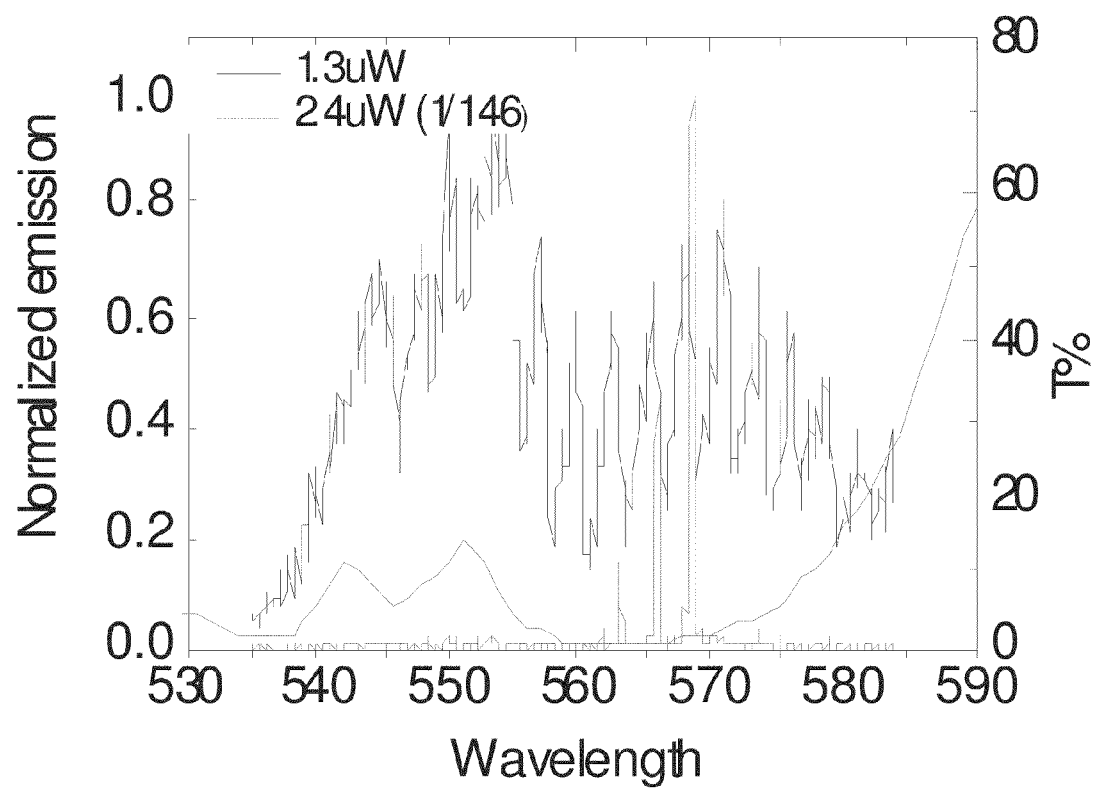
FIG. 12 illustrates plots showing (A) emission spectrum of a R6G sample pumped below threshold and above threshold, and (B) threshold trend observed on R6G samples in accordance with an aspect of the invention.
Figure 12B:
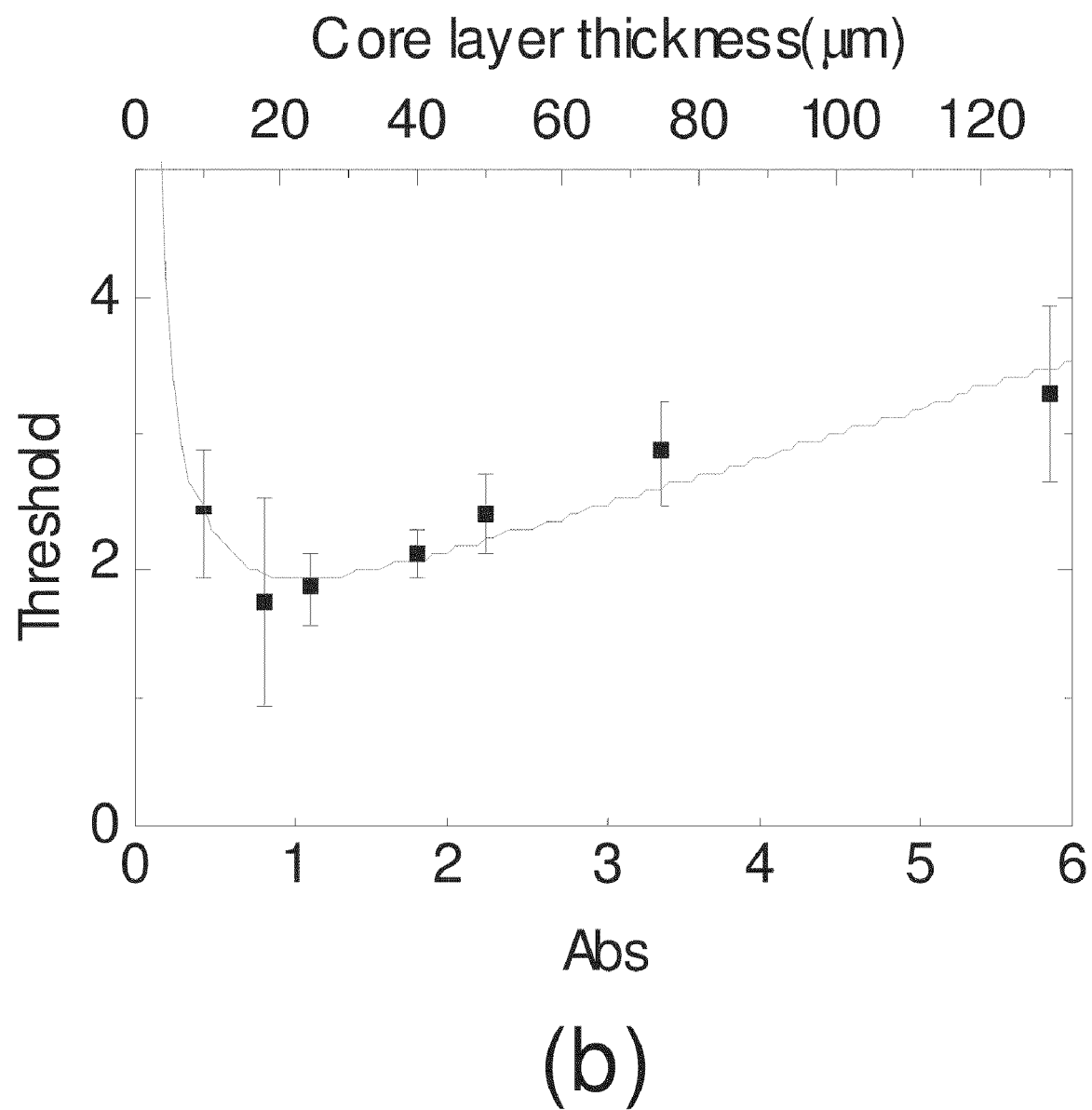

Typical emission spectra both below and above threshold for DBR laser samples are shown in FIG. 12($a$). Multimode emission was observed with the number of modes and spacing, of course, depending on the film thickness. Emission near the band center is as expected. The spectral width (full width half maximum) of a single lasing mode is about 0.4 nm, near the instrumental resolution. The emission spectra of the photoluminescent dyes employed are rather broad with distinct phonon modes, as shown in FIG. 7. By contrast, the emission spectra of the DBR devices pumped below the lasing threshold are more complex and include contributions that arise from the reflection of the multilayer film and also periodic oscillations as shown in FIG. 12($a$). The oscillations are due to interference effects associated with DBR cavity reflection, and are indicative of the cavity modes.

Figure 11:
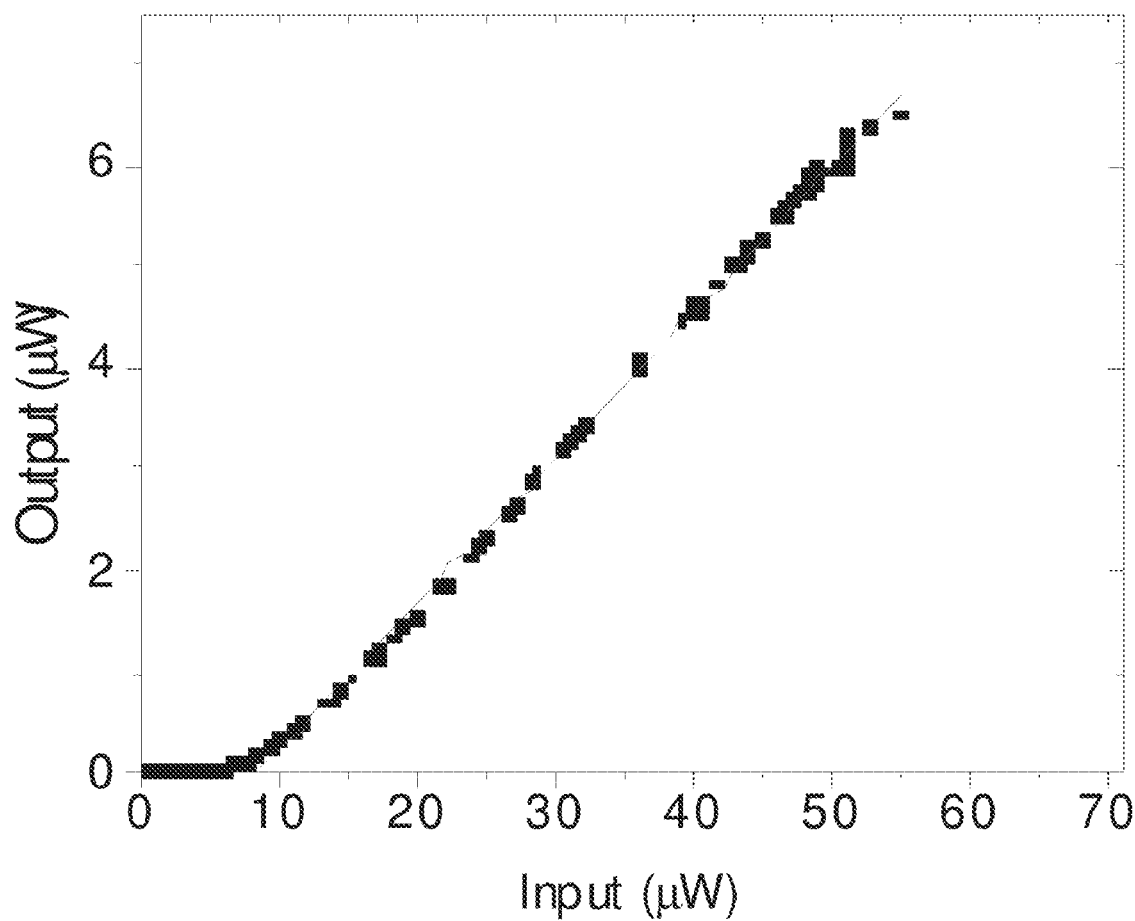
FIG. 11 illustrates a plot of output power versus input power of a CIRG laser in accordance with an aspect of the present invention.

We also characterized the energy conversion efficiency of the lasers studied. A typical plot of output power in the forward direction versus input power is shown in FIG. 11. The slope efficiency for this sample is 14.3%. The highest efficiency observed for C1RG lasers was 14.3% in a device having a 120 $\mu$m PMMA thick gain layer doped with 1.3× 10$^{-2}$ M dye. The highest efficiency we observed was 19.3% for a R6G sample having a 40 $\mu$m PMMA corelayer doped with 5.4×10$^{-3}$ M dye.

The lasing thresholds as a function of thickness for R6G films having a gain medium doped at 5.4×10$^{-3}$ M are shown in FIG. 12($b$). The relatively large uncertainties are due to sample to sample variations, as well as variations across the sample surface of the DBR films that are correspondingly due to variations in the layer thicknesses across the surface as noted above. For each sample, results were averaged over several spots on the surface. Despite the uncertainties, it can be determined from FIG. 12($b$) that R6G lasers comprising a gain medium doped with 5.4×10$^{-3}$ M dye exhibit a threshold minimum when the core thickness is about 25 $\mu$m. This corresponds to an optical density (O.D.) of about 1.1. For lasers containing either R6G or C1-RG doped gain media of various dye concentrations, the minimum threshold was observed to be in the 1.1-1.4 O.D. indicating this is a generally favorable design criterion.

We have described all-polymer surface emitting microresonator dye lasers with distributed Bragg reflectors. These lasers are produced entirely by melt-processes that lend themselves to high-throughput roll-to-roll production methods. Low threshold, high efficiency lasers having well-defined spatial and temporal modes were observed. Threshold measurements for lasers of various thickness and dye concentration were consistent with a simple four-level lasing model including inhomogeneous end-pumping and re-absorption.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A polymer film laser comprising a plurality of extruded polymer layers comprising a plurality of alternating dielectric layers of a first polymer material having a first refractive index and a second polymer material having a second refractive index different than the first refractive index, the plurality of alternating dielectric layers forming a first distributed Bragg reflector stack and a second distributed Bragg reflector stack, the plurality of extruded polymer layers comprising at least one extruded polymer gain medium layer sandwiched between the first distributed Bragg reflector stack and the second distributed Bragg reflector stack.

2. The laser of claim 1, the plurality of polymer layers being coextruded to form a free-standing film.

3. The laser of claim 1, being laminated on an electrically energized light pump.

4. An array of a plurality of lasers of claim 1, being laminated on a plurality of electrically energized light pumps.

5. The laser of claim 1, one or more of the plurality of alternating dielectric layers including multiple emissive moieties for multiple color outputs.

6. An array of a plurality of lasers of claim 1, being stacked on one another to produce multiple color outputs.

7. An array of polymer film lasers, each comprising a plurality of co-extruded polymer layers that form a free-standing film comprising a plurality of alternating dielectric layers of a first polymer material having a first refractive index and a second polymer material having second refractive index different than the first refractive index, at least one of the plurality of co-extruded polymer layers comprising one or more gain medium layers, the plurality of alternating dielectric layers forming a first distributed Bragg reflector stack and a second distributed Bragg reflector stack and the one or more gain medium layers being sandwiched between the first distributed Bragg reflector stack and the second distributed Bragg reflector stack.

8. The array of polymer film lasers of claim 7, being stacked on one another to produce multiple color outputs.

9. The array of polymer film lasers of claim 7, one or more of the plurality of alternating dielectric layers including multiple emissive moieties for multiple color outputs.

10. The array of polymer film lasers of claim 9, the multiple emissive moieties for multiple color outputs provide energy transfer and other interactions for providing up and down conversion and/or multiple color outputs.

11. The array of polymer film lasers of claim 7, being laminated on a plurality of electrically energized light pumps.

12. A method of forming a polymer laser, the method comprising:
   coextruding layers of a first polymer material having a first refractive index and a second polymer material having second refractive index different than the first refractive index to form a plurality of alternating dielectric layers;
   multiplying the plurality of alternating dielectric layers to form at least one alternating dielectric layer stack by forming a first distributed Bragg reflector stack and a second distributed Bragg reflector stack; and
   extruding one or more gain medium layers sandwiched between the first distributed Bragg reflector stack and the second distributed Bragg reflector stack.

13. The method of claim 12, at least one the plurality of alternating dielectric layers of one of the first polymer material and the second polymer material being gain medium layers.

14. The method of claim 12, further comprising laminating the at least one alternating dielectric layer stack on an electrically energized light pump.

15. The method of claim 14, further comprising laminating a plurality of dielectric layer stacks on a plurality of electrically energized light pumps.

16. The method of claim 12, further comprising stacking a plurality of dielectric layer stacks to produce multiple color outputs.

17. The method of claim 12, further comprising providing one or more of the plurality of alternating dielectric layers with multiple emissive moieties for multiple color outputs.

* * * * *